F. H. ROYCE.
MOTOR ROAD VEHICLE.
APPLICATION FILED OCT. 28, 1911.

1,024,652.

Patented Apr. 30, 1912.

WITNESSES.

INVENTOR.
F. H. Royce.

UNITED STATES PATENT OFFICE.

FREDERICK HENRY ROYCE, OF DERBY, ENGLAND.

MOTOR ROAD-VEHICLE.

1,024,652.  Specification of Letters Patent.  Patented Apr. 30, 1912.

Application filed October 28, 1911. Serial No. 657,342.

*To all whom it may concern:*

Be it known that I, FREDERICK HENRY ROYCE, a subject of the King of Great Britain and Ireland, residing at Nightingale Road, Osmaston Road, Derby, in the county of Derby, England, have invented certain new and useful Improvements in and Relating to Motor Road-Vehicles, of which the following is a specification, reference being had therein to the accompanying drawing.

This invention relates to the suspension of motor vehicles, and it has for its object the utilization of inverted suspension springs of the so-called cantaliver type in a more simple manner than at present obtains.

A further object is to reduce the number of working parts at present necessary in this type of suspension when employed in connection with the driving axle. I attain this end by employing in combination with springs of the live axle type in which the propeller shaft is carried in a tubular member which is rigidly attached to the axle case and which is connected to the frame at its forward end by a universal joint so that said tubular member operates both as a torque member and a radius rod.

Figure 1:
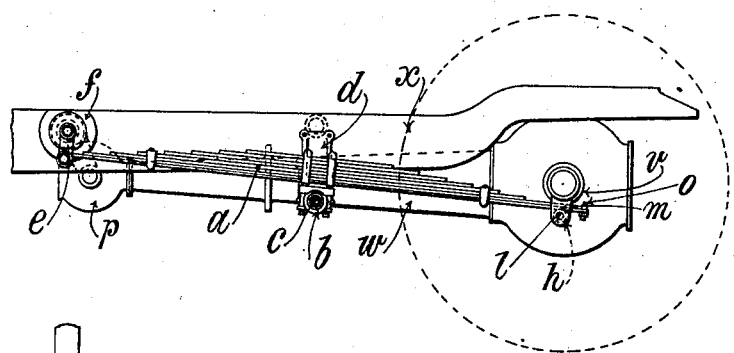
Figure 2:
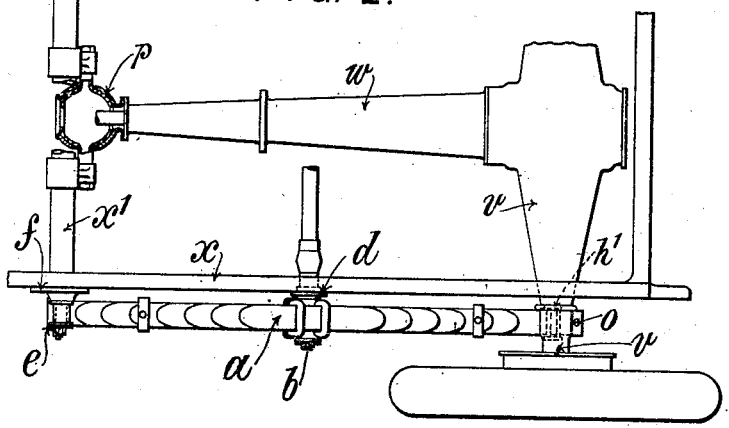

In the accompanying drawing which illustrates this invention:—Figure 1 is a view in side elevation of the rear part of a chassis of a motor road vehicle embodying this invention, and Fig. 2 is a view in plan thereof.

In both views similar parts are marked with like letters of reference.

The inverted springs $a$ are pivotally attached to the side members of the main frame $x$ by means of blocks $b$ each of which is attached to its spring at the point of maximum bending moment. These blocks engage with pins or shafts $c$ integral with or rigidly attached to brackets $d$ rigidly mounted on the side members of the main frame $x$ which may be suitably stiffened at this point by cross members or other means. The front end of each of the springs $a$ is supported on the side member of the main frame by means of a link $e$ which is pivoted to a bracket $f$ formed on or attached to said side member. The rear end of each of the springs $a$ rests on a roller $h$ mounted on a pin $l$ carried by a hanging bracket $m$ formed on or attached to the rear axle casing $v$. Lateral movement of the springs $a$ relatively to the rear axle is prevented either by means of collars $h^1$ formed on the ends of the rollers $h$ as shown or by causing the springs to engage with the inside faces of the brackets. A safety stop such as $o$ may be provided to prevent the axle from leaving the frame in the event of the tubular member $w$ inclosing the propeller shaft breaking. The tubular member $w$ which carries the propeller shaft is rigidly attached to the axle casing $v$ at one end and at the other end is attached to one of the cross members $x^1$ of the main frame $x$ by a universal joint $p$.

The action of this improved suspension is as follows:—The axle casing and the tubular member carrying the propeller shaft form a rigid transmission unit between the driving axle and the main frame of the vehicle which operates with the lateral rigidity of the inverted springs to constrain the driving axle to move only in a vertical direction relatively to the frame— said movement being controlled by the vertical resilience of the springs—but allows either wheel to rise relatively to the other without throwing any strain on the controlling mechanism.

What I claim as my invention, and desire to secure by Letters Patent is:—

In a motor car, the combination, with a frame provided with a crossbar, an axle casing provided with a longitudinal member, a universal joint connecting the said member and crossbar, an axle mounted in the said casing, and road wheels carried by the said axle; of leaf springs having their middle parts pivotally connected to the frame between the said crossbar and axle, links pivotally connecting the front ends of the said springs with the frame, and rollers, for the rear end portions of the said springs to run or bear on, said rollers being supported by the said axle-casing.

In testimony whereof I affix my signature in the presence of two subscribing witnesses.

FREDERICK HENRY ROYCE.

Witnesses:
C. K. EDDOWES,
JOHN DE LOOZE.